United States Patent
Laaksonen (10) Patent No.: US 10,275,650 B2
(45) Date of Patent: Apr. 30, 2019

(54) APPARATUS, METHOD AND COMPUTER PROGRAM FOR DETERMINING INFORMATION TO BE PROVIDED TO A USER

(71) Applicant: Nokia Technologies Oy, Espoo (FI)

(72) Inventor: Lasse Laaksonen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 38 days.

(21) Appl. No.: 14/701,770

(22) Filed: May 1, 2015

(65) Prior Publication Data

US 2015/0347852 A1 Dec. 3, 2015

(30) Foreign Application Priority Data

Jun. 2, 2014 (GB) .................................. 1409736.4

(51) Int. Cl.
| | | |
|---|---|---|
| *G06K 9/00* | (2006.01) | |
| *H04W 4/02* | (2018.01) | |
| *G06Q 10/02* | (2012.01) | |
| *H04M 1/725* | (2006.01) | |
| *G06F 3/0484* | (2013.01) | |

(52) U.S. Cl.
CPC ..... *G06K 9/00671* (2013.01); *G06F 3/04842* (2013.01); *H04M 1/72569* (2013.01); *H04W 4/02* (2013.01); *G06Q 10/02* (2013.01); *H04M 2250/22* (2013.01)

(58) Field of Classification Search
None
See application file for complete search history.

(56) References Cited

U.S. PATENT DOCUMENTS

| | | | |
|---|---|---|---|
| 2005/0120379 A1* | 6/2005 | Van Agt ............... | H04N 5/4401 725/100 |
| 2011/0270669 A1* | 11/2011 | Rowe .................... | G06Q 30/02 705/14.37 |
| 2012/0062395 A1* | 3/2012 | Sonnabend ........ | G06K 9/00791 340/932.2 |
| 2012/0084664 A1* | 4/2012 | Torgerson ............. | G06F 9/4443 715/747 |
| 2013/0120387 A1 | 5/2013 | Mueller | |
| 2013/0143536 A1 | 6/2013 | Ratti | |

(Continued)

OTHER PUBLICATIONS

"Tidal Flows Around Anglesey", archived Dec. 6, 2013, https://web.archive.org/web/20131206103737/http://seakayakwales.com/TidalFlowAngles.asp Accessed Sep. 28, 2016.*

(Continued)

*Primary Examiner* — Kee M Tung
*Assistant Examiner* — Yanna Wu
(74) *Attorney, Agent, or Firm* — Mintz Levin Cohn Ferris Glovksy and Popeo, P.C.

(57) ABSTRACT

An apparatus, method and computer program wherein the apparatus comprises: processing circuitry; and memory circuitry including computer program code; the memory circuitry and the computer program code configured to, with the processing circuitry, cause the apparatus at least to perform; detecting user selection of a part of an image wherein the image is displayed on a display; obtaining context information; and determining information to be provided to the user based on the user selection, the displayed image and the obtained context information.

20 Claims, 8 Drawing Sheets

(56) References Cited

U.S. PATENT DOCUMENTS

2014/0159585 A1*  6/2014  Reed ................ H05B 33/0815
                                              315/130
2014/0176348 A1*  6/2014  Acker, Jr. ............. G08G 1/144
                                              340/932.2
2017/0118307 A1*  4/2017  Beaurepaire .......... H04L 67/327

OTHER PUBLICATIONS

"Tidal Flows Around Anglesey", Sea Kayak Wales, Retrieved on Dec. 22, 2015, Webpage available at : http://www.seakayakwales.com/TidalFlowAnglesey.aspx.

"SunTrajectory.Net", Augmented reality, Retrieved on Dec. 22, 2015, Webpage available at : http://suntrajectory.net/.

"Shangoo: Augmented Weather Forecasts", Augmented Reality Trends, Retrieved on Dec. 22, 2015, Webpage available at : http://www.augmentedrealitytrends.com/ar-app/shangoo-augmented-weather-forecasts.html.

* cited by examiner

APPARATUS, METHOD AND COMPUTER PROGRAM FOR DETERMINING INFORMATION TO BE PROVIDED TO A USER

TECHNOLOGICAL FIELD

Examples of the disclosure relate to an apparatus, method and computer program for enabling information to be provided to a user. In particular they relate to an apparatus, method and computer program for enabling information to be provided to a user of an electronic device such as a mobile communications device.

BACKGROUND

Users of electronic devices, such as mobile telephones and tablet computers, may wish to obtain access to information. For instance they may wish to obtain information about the surroundings they are in or they may wish to obtain information about a place or location that they are considering visiting.

It is useful to enable the users of such devices to access the information easily.

BRIEF SUMMARY

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform; detecting user selection of a part of an image wherein the image is displayed on a display; obtaining context information; and determining information to be provided to the user based on the user selection, the displayed image and the obtained context information.

In some examples the context information may comprise information relating to the user. In some examples the context information may comprise information relating to one or more items represented in the image. In some examples the context information may comprise at least one of positioning information, direction information, time of day.

In some examples the information to be provided to the user may comprise information relating to the selected part of the image. The information to be provided to the user may comprise information indicating how the selected part of the image changes over a period of time.

In some examples the memory circuitry and the computer program code may be further configured to, with the processing circuitry, cause the apparatus to perform obtaining the determined information. The memory circuitry and the computer program code may be further configured to, with the processing circuitry, cause the apparatus to perform providing the obtained information to a user. The obtained information may be provided to a user by displaying a graphical representation of the obtained information overlaying the image.

In some examples the determined information may be obtained without any further input from a user.

In some examples a plurality of items of information may be determined and a user selectable list is provided to a user to enable the user to select one or more items of information from the list.

In some examples the image may comprise an augmented reality image. In some examples the image may comprise a map. In some examples the image may comprise at least one of photographs, video images.

In some examples the image may have additional information associated with it and the additional information may be used to identify items in the image.

In some examples the user selection may comprise a user selecting one or more items in the image.

In some examples there may be provided an electronic device comprising an apparatus as described above.

According to various, but not necessarily all, examples of the disclosure there may be provided a method comprising: detecting user selection of a part of an image wherein the image is displayed on a display; obtaining context information; and determining information to be provided to the user based on the user selection, the displayed image and the obtained context information.

In some examples the context information may comprise information relating to the user. In some examples the context information may comprise information relating to one or more items represented in the image. In some examples the context information may comprise at least one of positioning information, direction information, time of day.

In some examples the information to be provided to the user may comprise information relating to the selected part of the image. The information to be provided to the user may comprise information indicating how the selected part of the image changes over time.

In some examples the method may further comprise obtaining the determined information. In some examples the method may further comprise providing the obtained information to a user. In some examples the obtained information may be provided to a user by displaying a graphical representation of the obtained information overlaying the image.

In some examples the determined information may be obtained without any further input from a user.

In some examples a plurality of items of information may be determined and a user selectable list is provided to a user to enable the user to select one or more items of information from the list.

In some examples the image may comprises an augmented reality image. In some examples the image may comprise a map. In some examples the image may comprise at least one of photographs, video images.

In some examples the image may have additional information associated with it and the additional information may be used to identify items in the image.

In some examples the user selection may comprise a user selecting one or more items in the image.

According to various, but not necessarily all, examples of the disclosure there may be provided a computer program comprising computer program instructions that, when executed by processing circuitry, enable: detecting user selection of a part of an image wherein the image is displayed on a display; obtaining context information; and determining information to be provided to the user based on the user selection, the displayed image and obtained context information.

According to various, but not necessarily all, examples of the disclosure there may be provided a computer program comprising program instructions for causing a computer to perform any of the methods described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided examples as claimed in the appended claims.

BRIEF DESCRIPTION

For a better understanding of various examples that are useful for understanding the description, reference will now be made by way of example only to the accompanying drawings in which.

DETAILED DESCRIPTION

The Figures illustrate an apparatus 1 comprising: processing circuitry 5; and memory circuitry 7 including computer program code 11; the memory circuitry 7 and the computer program code 11 configured to, with the processing circuitry 5, cause the apparatus 1 at least to perform; detecting user selection of a part of an image 63 wherein the image 63 is displayed on a display 23; obtaining context information; and determining information 17 to be provided to the user based on the user selection, the displayed image 63 and the obtained context information.

This provides the technical effect of accurately determining the information that a user may require without requiring the user to make detailed or complicated user inputs.

The apparatus 1 may be for wireless communication.

Figure 1:
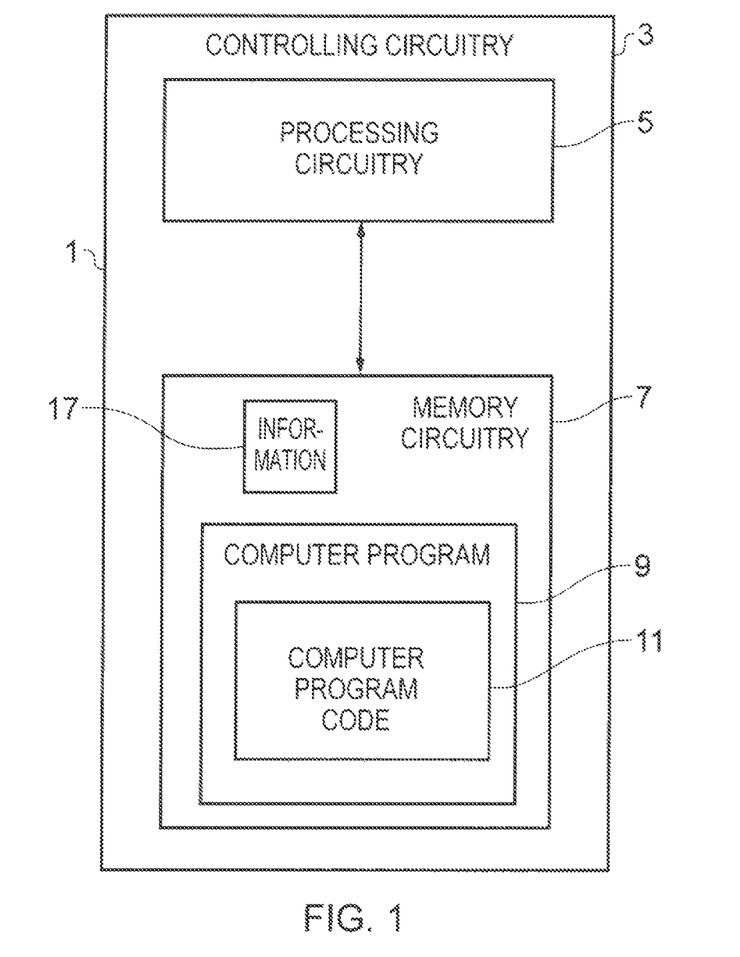
FIG. 1 illustrates an apparatus.
Figure 2:
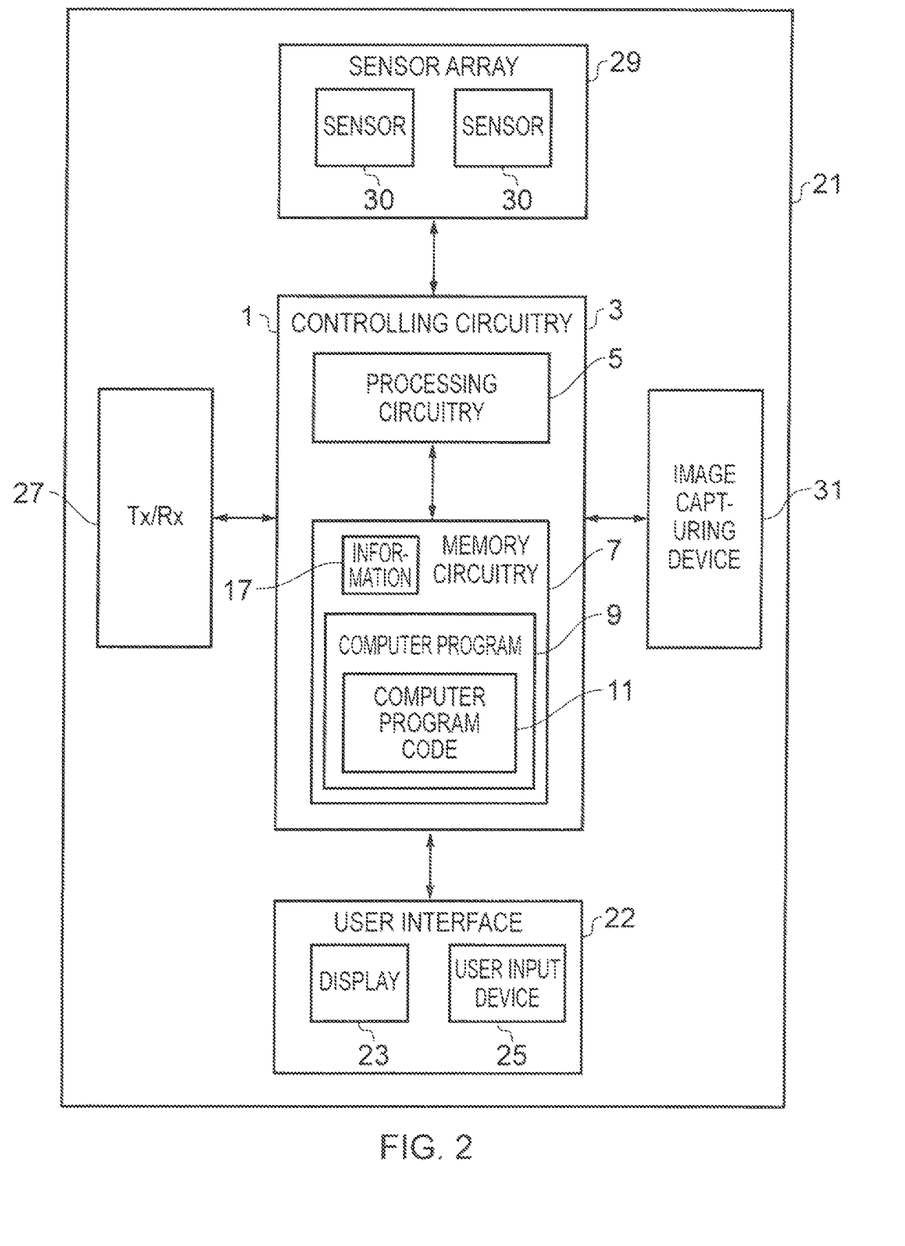
FIG. 2 illustrates an electronic device.
Figure 3:
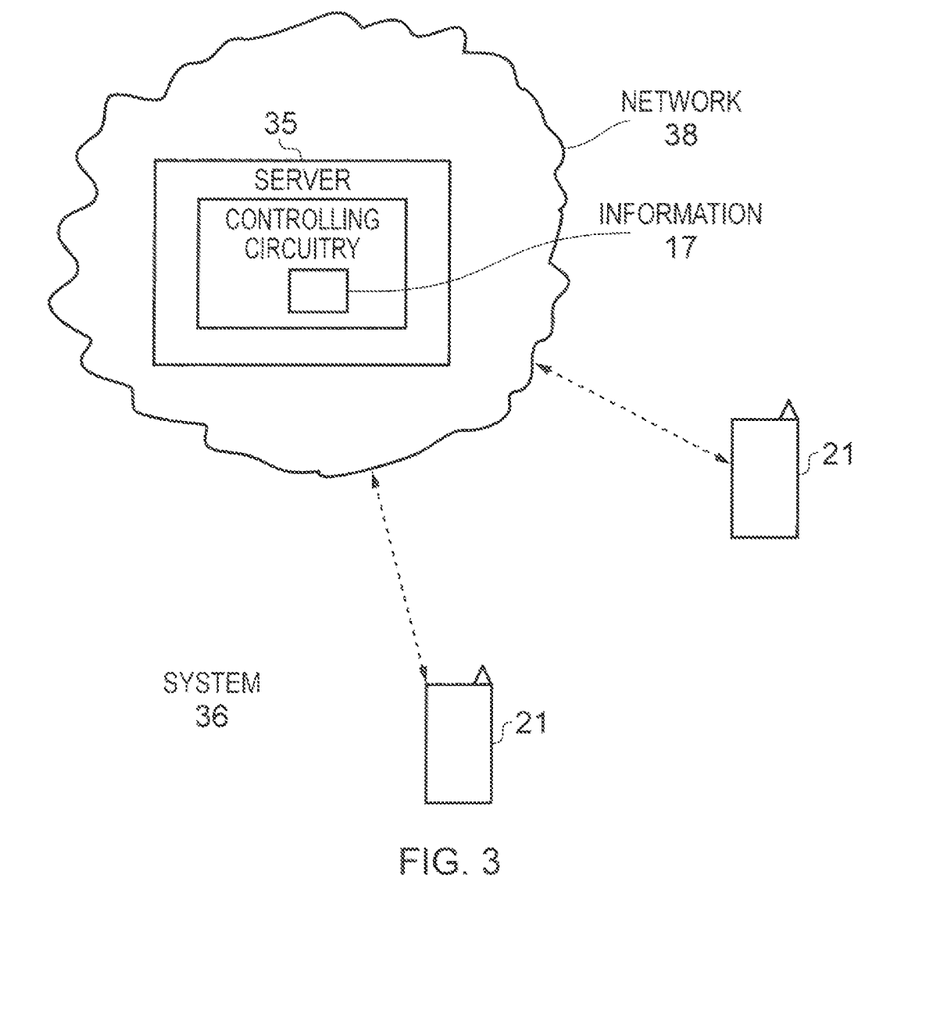
FIG. 3 illustrates a system.

FIG. 1 schematically illustrates an example apparatus 1 which may be used in implementations of the disclosure. The apparatus 1 illustrated in FIG. 1 may be a chip or a chip-set. The apparatus 1 may be provided within an electronic device 21. An example electronic device 21 is illustrated in FIG. 2. In some examples the apparatus 1 may be provided within a device such as a server. An example server 35 and system 36 are illustrated in FIG. 3.

The example apparatus 1 comprises controlling circuitry 3. The controlling circuitry 3 may comprise one or more controllers. The controlling circuitry may comprise means for controlling the apparatus 1. The controlling circuitry 3 may be implemented using instructions that enable hardware functionality, for example, by using executable computer program instructions in a general-purpose or special-purpose processing circuitry 5 that may be stored on a computer readable storage medium (disk, memory etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enables the apparatus 1 to perform the example methods illustrated in FIGS. 4 and 5. The processing circuitry 5 by reading the memory circuitry 7 is able to load and execute the computer program 9.

In the example apparatus 1 of FIG. 1 information 17 may be stored in the memory circuitry 7. The information 17 may be retrieved from the memory circuitry 7 and provided to a user in some of the examples of the disclosure.

The apparatus 1 therefore comprises: processing circuitry 5; and memory circuitry 7 including computer program code 11; the memory circuitry 7 and the computer program code 11 configured to, with the processing circuitry 5, cause the apparatus 1 at least to perform; detecting user selection of a part of an image wherein the image 63 is displayed on a display 23; obtaining context information; and determining information 17 to be provided to the user based on the user selection, the displayed image 63 and the obtained context information.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program 9. The apparatus 1 may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates an example electronic device 21 which may be used in implementations of the disclosure. The electronic device 21 of FIG. 2 comprises controlling circuitry 3, a user interface 22, a transceiver 27, an image capturing device 31 and one or more sensors 30. It is to be appreciated that only features necessary for the following description have been illustrated in FIG. 2 and that other examples may comprise additional features.

The electronic device 21 may comprise any electronic device 21 which may be used to determine information which is to be provided to a user. The electronic device 21 may comprise a portable user device. For example, the electronic device 21 may be a device such as a mobile telephone, a tablet computer, a digital camera, a gaming device or any other suitable device. The electronic device 21 may be a portable electronic device 21 which can be carried in a user's hand or bag. The electronic device 21 may be a hand held device such that it is sized and shaped so that the user can hold the electronic device 19 in their hand while they are using the electronic device 21.

The controlling circuitry 3 of FIG. 2 may be as illustrated in FIG. 1 and described above. Corresponding reference numerals are used for corresponding features.

In the example of FIG. 2 the user interface 22 may comprise any means which enables a user to interact with the electronic device 21. The user interface 22 may be configured to provide outputs to the user and enable a user to make user inputs. In the example of FIG. 2 the user interface 22 comprises a display 23 and a user input device 25.

The display 23 may comprise any means which may enable information to be displayed to a user. The display 23 may comprise any suitable display such as a liquid crystal display, light emitting diode, organic light emitting diode, thin film transistor or any other suitable type of display.

The information which is displayed on the display 23 may comprise information 17 which may be stored in the memory circuitry 7. The information which is displayed on the display 23 may also comprise information which is input by the user using the user input device, information which is received using the transceiver 27 or any other suitable information.

The information which is displayed on the display 23 may comprise one or more images. The images may comprise pictures that have been created and stored in electronic form. In some examples the images may comprise photographs or video images. The photographs or video images may be captured by the image capturing device 31. The images obtained by image capturing device 31 may be processed in real time so that the images on the display 23 correspond to the surroundings of the user.

In some examples the images displayed on the display 23 may comprise schematic images such as maps or plans. In other cases the images may comprise graphical representations of real world items. For example, rather than a photograph of a location a diagram or illustration of the location could be displayed instead.

In some implementations the images which are displayed on the display 23 may comprise an augmented reality image. In such examples the images displayed on the display 23 may be augmented by additional information such as tags or other metadata. The additional information may be used to enable items in the image to be identified. The additional information could identify businesses or places within the image. In some examples the augmented reality view may comprise Nokia city lens or any other suitable application.

In some examples the additional information which may be used to augment the image may comprise information which may be generated by the controlling circuitry 3 in response to information obtained from the one or more sensors 30. The information which is obtained from the sensors 30 may comprise spatial information, audio information or any other suitable information. This may enable the image to be augmented with context information.

The user input device 25 may comprise any means which enables a user to input information into the electronic device 21. The information may be used to control the electronic device 21.

In some examples the user input device 25 may comprise a touch pad. The touch pad may be integrated within the display 23 to provide a touch sensitive display. The touch pad may comprise any means which may enable a user to make an input into the electronic device 21 by touching the surface of the touch pad with an object or bringing an object into proximity of the surface of the touch pad. The objects used to make the user input could be any of a user's fingers including their thumbs or an object such as a stylus.

The user interface 22 may comprise other user input devices 25 instead of, or in addition to, the touch pad. For example the electronic device 21 could comprise a keypad, motion sensors, voice recognition devices or a combination of different types of user input devices.

The transceiver 27 may comprise one or more transmitters and/or receivers. The transceiver 27 may comprise any means which enables the electronic device 21 to establish a communication connection with a remote device, such as a server 35, and exchange information with the remote device. The communication connection may comprise a wireless connection. It is to be appreciated that in some examples the communication connection may also comprise a wired connection.

In some examples the transceiver 27 may enable the electronic device 21 to connect to a network. The network may comprise a cellular or non-cellular network. In some examples the transceiver 27 may enable the apparatus 1 to communicate in local area networks such as wireless local area networks, Bluetooth™ networks or any other suitable network.

The example electronic device 21 of FIG. 2 also comprises an image capturing device 31. The image capturing device 31 may comprise any means which enables the electronic device 21 to obtain images. The image capturing device 31 may comprise an image sensor which may be configured to convert light incident on the image sensor into an electrical signal to enable an image to be produced. The image sensors may comprise, for example, digital image sensors such as charge-coupled-devices (CCD) or complementary metal-oxide-semiconductors (CMOS). The images which are obtained may provide a representation of a scene and/or objects which are positioned in front of the image capturing device 31.

The controlling circuitry 3 may be configured to read out the electrical signal from the image sensors. For example, the processing circuitry 5 may be configured to retrieve an electrical signal comprising image data from the image sensor and store it in the memory circuitry 7. The image data which is obtained from the image sensors may be in the form of a still image or a video image. The controlling circuitry 3 may enable the image to be displayed on the display 23.

In the example of FIG. 2 only one image capturing device 31 is illustrated. In some examples the electronic device 21 may comprise more than one image capturing device 31. For example the electronic device 21 may comprise a front face camera, a rear face camera, a dual camera that captures 3D images or any combination of such image capturing devices 31.

In the example of FIG. 2 the electronic device 21 also comprises one or more sensors 30 which may be arranged in a sensor array 29. The one or more sensors 30 may comprise any means which enables context information to be determined. The context information may comprise information relating to the current situation of the user such as the user's location, the people around the user or any other suitable information.

In some examples the sensors 30 may comprise one or more positioning sensors. The sensors 30 may enable the position of the electronic device 21 to be determined. In some examples the sensor array 29 may comprise sensors 30 which may be used to determine the direction in which the electronic device 21 or the user of the electronic device 21 is facing.

FIG. 3 illustrates an example system 36 which may be used in some examples of the disclosure. The example system of FIG. 3 comprises one or more electronic devices 21 and a server 35. The electronic devices 21 may be as described above in relation to FIG. 2. Corresponding reference numerals are used for corresponding features.

The server 35 may be located remotely to the electronic devices 21. The server 35 may be configured to communicate with one or more of the electronic devices 21 via a communications network 38. The communications network 38 may comprise a wireless communication network such as a cellular network or a Bluetooth network or any other suitable network.

The server 35 may comprise controlling circuitry 3. The controlling circuitry 3 may comprise processing circuitry 5 and memory circuitry 7 which may be as described above in relation to FIG. 1.

The servers 35 may be configured to store information 17. The information 17 may be stored in the memory circuitry 7 which may be part of the controlling circuitry 3. The information 17 may comprise information which the users of the electronic devices 21 may wish to obtain. The information 17 may relate to predictions or estimations relating to the future conditions of a location or item which is currently displayed in an image on the user's electronic device 21. For example the information 17 may relate to geographical predictions such as the weather or the position of the tide. In some examples the prediction may relate to the estimated movements of people. The information may comprise information relating to the positions and/or movement of people, it may comprise predictions about levels of traffic or availability of parking spaces or any other suitable information. In some examples the predictions or estimates within the information 17 may be calculated by the server 35. In other examples the predictions may be obtained from other sources and stored in the server 35 so that they can be accessed by the electronic devices 21. Information may be accessed from other devices in order to enable some predictions to be made. For example information from the tracked movements or predicted movements of a user's phone or car may be used to estimate the number of people expected to be in a location at a particular time.

If it is determined that the user of the electronic device 21 wishes to obtain the information 17 then the server 35 may be configured to retrieve the information 17 from the memory circuitry 7 and enable the information 17 to be transmitted to the electronic device 21 via the communications network 38. Once the information 17 has been received by the electronic device 21 it may be provided to the user in any suitable form.

Figure 4:
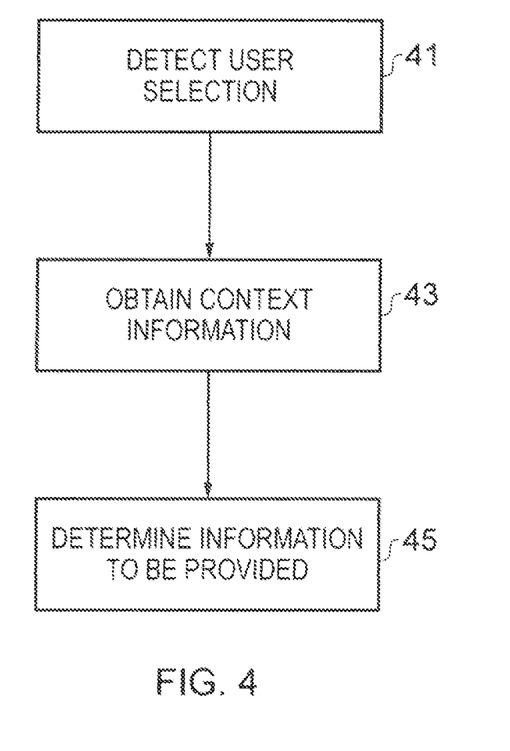
FIG. 4 illustrates a method.

FIG. 4 illustrates a method according to examples of the disclosure. The method may be implemented using apparatus 1, electronic devices 21 and a system 36 as described above.

The method comprises, at block 41 detecting user selection of a part of an image where the image is displayed on a display 23. The method also comprises, at block 43, obtaining context information. At block 45 the method may also comprise determining information 17 to be provided to the user based on the user selection, the displayed image and the obtained context information.

In some examples the method may be carried out by one apparatus 1. For example, in some implementations an electronic device 21 may be configured to perform all of the blocks of the method. In such cases, once the information 17 to be provided has been determined the information 17 may be retrieved from the memory circuitry 7 within the electronic device 21 and/or from a remote device such as a server 35.

In other implementations the method may be carried out by a device such as a server 35. In such implementations the server 35 may be configured to receive input signals from an electronic device 21 in order to enable the information 17 to be determined. For example, the electronic device 21 may be configured to transmit information indicative of the context of the user and a user selection of a part of an image. The context information may comprise any suitable information such as the current location of the user, calendar information which may be stored in the electronic device 21 or information relating to previous activities of the user. The server 35 may then use the received information to determine the information 17 which is to be provided to the user.

Figure 5:
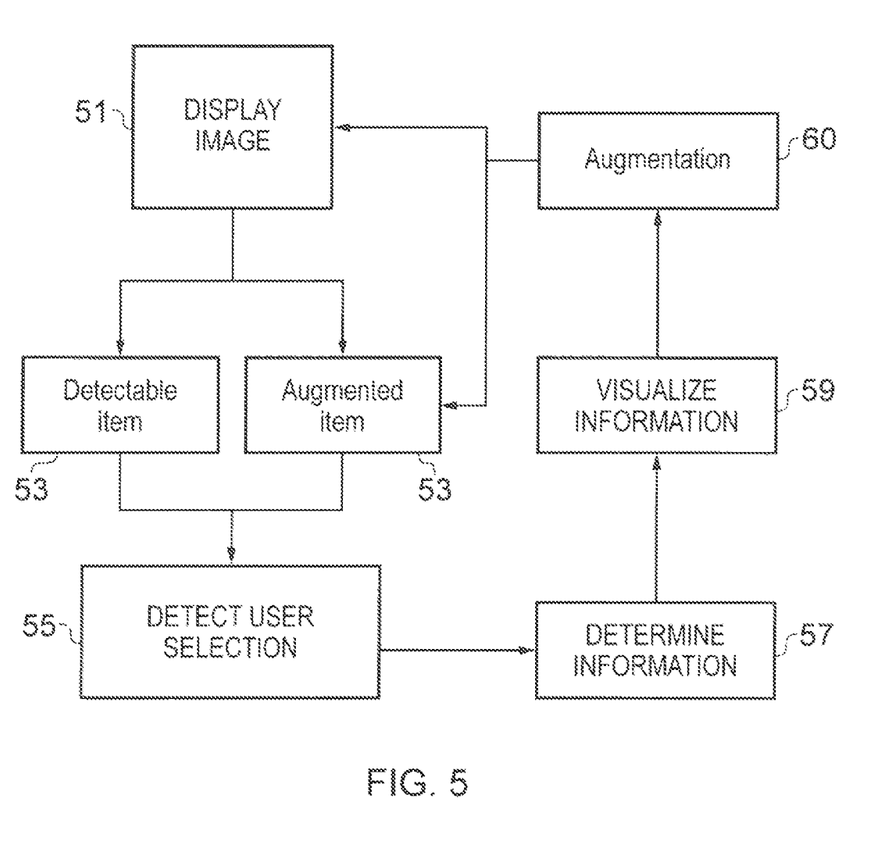
FIG. 5 illustrates a method.

FIG. 5 illustrates another method according to examples of the disclosure. The method may be implemented using apparatus 1, electronic devices 21, a server 35 and a system 36 as described above.

At block 51 the method comprises displaying an image on a display 23. The images may comprise any pictures that have been created and stored in electronic form.

In some examples the image may comprise videos or photographs. The videos and/or photographs may be captured by the image capturing device 31. In some examples the videos and/or photographs may be received via the transceiver 27 and stored in the memory circuitry 7. For example the electronic device 21 may be configured to obtain images such as photographs and videos from a remote server 35 and enable them to be displayed on the display 23.

In some examples the image may comprise a schematic representation of a location or building or means of transport. For example, the image may comprise a map or a plan of a building or a seating plan of a means of transport such as an aeroplane or a seating plan of a venue such as a theatre or sports stadium. It is to be appreciated that other images may be used in other examples of the disclosure.

At block 53 any detectable items and/or augmented items in the image may be identified.

A detectable item may comprise any item within the image which may be identified. The items may be identified by analysing the image. For example the items may be identified using pattern recognition or any other suitable technique.

In some examples the items within the image may be identified using context information. The context information may comprise information which has been obtained by the sensors 30 or information which has been accessed by the electronic device. For instance, in some examples the context information may comprise the location of the user which may be obtained from positioning sensors. The positioning information may then be used to predict the items that are displayed in the image. In some examples the context information may comprise audio information which may be detected by the one or more sensors. In some examples the context information may comprise information which may be obtained from applications within the electronic device such as a calendar application or navigation application or any other suitable application.

An augmented item may comprise an item within the image which has additional data associated with it. The additional data may comprise data which identifies the item. The additional data may comprise metadata or a tag or any other suitable type of data. The additional information may comprise context information relating to one or more items which are represented in the image.

For example, in cases where the image comprises a map the additional data may comprise the identification of locations and/or businesses within the map. In some examples the additional information may comprise information which relates to properties of item. Where the item comprises a shop or business the additional information may comprise information relating to the type of shop or business or the opening hours of the shop or business or any other suitable information.

In cases where the image comprises video or photographs the additional information may comprise tags which may identify items within the image. The tags may also comprise additional information such as ratings by other users, opening hours for business or any other suitable information.

In some examples the additional information may be displayed on the display overlaying the image. In other examples the additional information may be provided to a user in response to a user input.

At block 55 user selection of an item is detected. The user may select an item by using the user input device 25. The user may select an item in an image by actuating the area of the image in which the item is displayed. In examples where the user interface 22 comprises a touch sensitive display, a user may actuate an area of an image by touching the surface of the display 23 in the area in which the item is displayed.

In some examples the user input may link two or more items together. For instance the user may make a user input which selects both a parking space and a shop or business. In response to such an input the controlling circuitry 3 may be configured to obtain context information relating to one or both of the items. For example the controlling circuitry 3 may obtain context information comprising the opening hours of the shop or business. This information may be provided as additional information within the image.

It is to be appreciated that the user input which is made to select an item may comprise any suitable type of user input. For example, the user input may comprise a touch input, a trace input, a double press input, a multi-touch input or any other suitable input.

At block 57 the information 17 which is to be provided to the user is determined. The information 17 which is to be provided to the user may be determined in response to the detection of the user selection of the item in the image.

The information 17 which is to be provided to the user may relate to the part of the image which is selected at block 55. The information 17 may comprise information indicating how the selected part of the image may change over time.

The information which is to be provided to the user may be determined using a combination of the item which has been selected, context information which has been obtained and the image which is displayed on the display 23. The context information may comprise information relating to the user and/or information relating to one or more items in the image. In some examples the context information may be obtained in response to the user input. In other examples the context information may be provided automatically.

By aggregating these different types of information together the controlling circuitry may be able to identify which information the user would like to obtain. There may be a plurality of different types or pieces of information which may be available to the user. In some examples there could be a very large amount of information available. By using a combination of the item or items which has been selected, context information which has been obtained and the image which is displayed on the display 23 the information which the user is most likely to want can be identified so that the user does not need to make the selection from a large group. This also means that the user does not need to make any complicated or difficult user inputs. It also means that the user can obtain the information without having to search manually.

In some examples once the user input of block 55 has been completed the information 17 is determined automatically without any further input. In other examples a plurality of items of information 17 may be identified at block 57. In such examples a user selectable list may be provided to a user to enable the user to select one or more items of information from the list.

Once the information 17 which is to be provided to the user has been determined the information 17 may be obtained. The information 17 may be retrieved from the memory circuitry 7 of the electronic device 21 or from the memory circuitry of a remote device such as a server 35.

In the example of FIG. 5 once the information has been obtained a visualization of the information is created at block 59. The visualization of the information may comprise a graphical representation of the information 17.

The graphical representation of the information 17 may comprise a static image or a dynamic image. The static image may comprise information which does not change over time or may provide information relating to one particular point in time. The dynamic image may provide a visualisation of how a parameter may change over time. For example it may show how the tide position is estimated to move or how many cars are expected to be in a car park. The time range which the user is likely to be interested in may be determined using the context information. For instance the context information which is obtained may comprise the opening hours of a shopping centre. It may be determined that the user is only likely to be interested in information such as parking and traffic levels for the time range which coincides with the opening hours of the shopping centre.

At block 60 the graphical representation is used to augment the image displayed on the display 23 so that the information 17 may be provided to the user. The method then returns to block 51 and the image is displayed on the display 23 in combination with a graphical representation of the information 17.

FIGS. 6A to 6D illustrate an example of the disclosure in use. In the example of FIGS. 6A to 6D an example of the disclosure is used to provide a user with information relating to the position of the tide. The example may be implemented using methods and apparatus as described above. The example electronic device 21 in FIGS. 6A to 6D may comprise a touch sensitive display 23.

In FIGS. 6A to 6D the user of the electronic device 21 is on a vacation. The user has jumped off a longtail boat onto Freedom Beach in Phuket, Thailand. The user wants to find a suitable location to place his towel on the sand, such that it doesn't get wet during high tide.

Figure 6A:
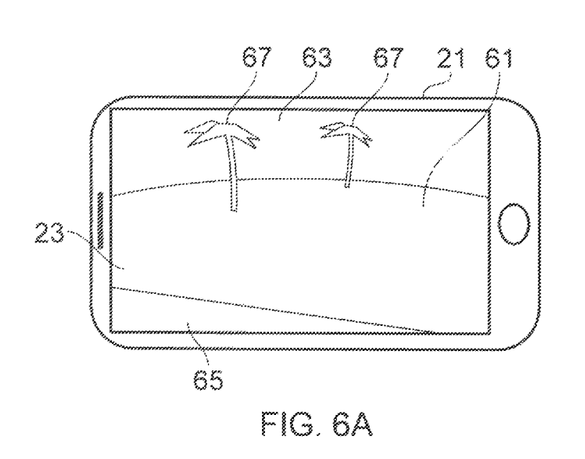
FIGS. 6A to 6D illustrates an example of the disclosure.

In FIG. 6A the user uses his electronic device 21 to view the beach 61 through the image capturing device 31. The image 63 which is displayed on the display 23 comprises a photographic representation of the beach 61 which is currently in front of the user. The image 63 comprises the beach 61 and the water 65. In the example of FIG. 6A the image 63 also comprises two palm trees 67.

Figure 6B:
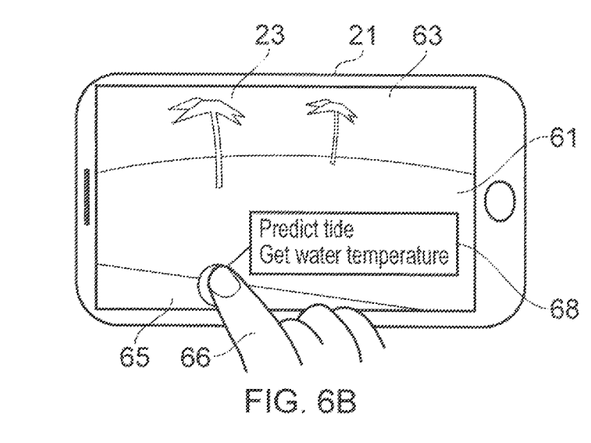

In FIG. 6B the user begins to make a user input. The user selects the edge of the water 65 by holding his finger 66 on the area of the display 23 in which the edge of the water 65 is displayed.

The electronic device 21 recognizes the selected item as the water 65. The electronic device 21 may identify the item from additional information associated with the image 63, the determined location of the user, by using pattern recognition or by any other suitable technique. For instance in some examples the water 65 may comprise a tag or other additional information which may identify the water 65. In other examples the item may be identified by determining that the user is located at a beach 61 from their position coordinates and using positioning sensors 30 to determine that the user is facing the water 65.

The electronic device 21 may determine information 17 that the user may wish to obtain. The information 17 may be determined from the item which has been selected, the context information which may have been obtained and the user input which has been made. In this example the context information may comprise the location of the user or it may comprise information indicating that the user is on holiday or any other suitable information.

In FIG. 6B the electronic device 21 has determined a plurality of items of information and a user selectable list 68 is provided to a user to enable the user to select one or more items of information from the list 68. The information 17 which may be obtained may relate to the item which has been selected. In the particular example of FIG. 6B the user selectable items comprise the position of the tide and the water temperature.

Figure 6C:
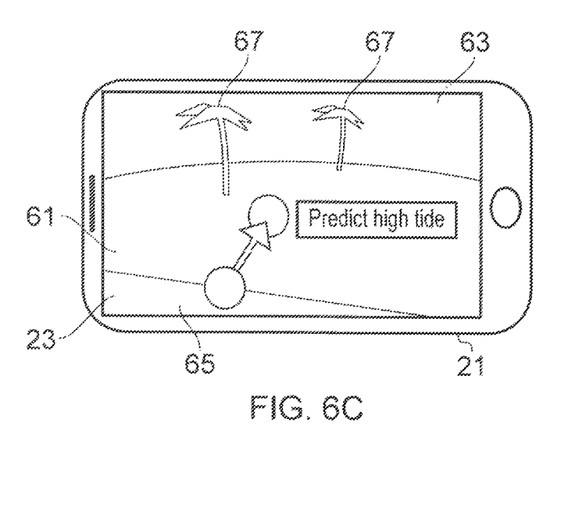

In FIG. 6C the user selects a second item in the image 63. In particular the user selects the beach 61 by dragging his finger 66 to the area of the display 23 in which the beach 61 is displayed. In response to this user input it may be determined that the information that the user wants is a prediction relating to both the water 65 and the beach 61. This may be identified as the position of the high tide.

Figure 6D:
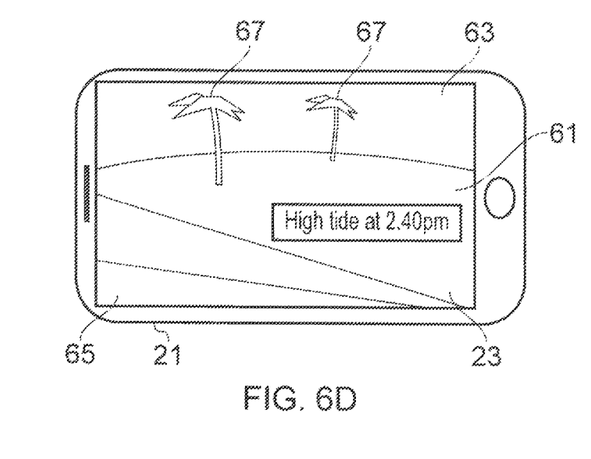

In FIG. 6D the information relating to the position of the tide is obtained and displayed on the display 23. Information relating to the current position of the user may be used to obtain the correct information relating to the tide. In the example of FIG. 6D the information relating to the position of the tide may be displayed as an augmented image on the display 23. The information may indicate the position of the high tide. In the example of FIG. 6D the information also comprises the estimated time of the high tide.

Once the user has this information they can place their towel at a safe distance from the sea 65 and enjoy the day.

In the example of FIGS. 6A to 6D the information is displayed overlaying the original image 63. It is to be appreciated that other ways of displaying the information may be used in other examples of the disclosure. For example, a second image may be displayed on the display 23 with a control element which may allow the user to switch between the first image 63 and the second image. The second image may comprise a map or any other suitable image.

FIGS. 7A to 7D illustrate an example of the disclosure. In the example of FIGS. 7A to 7D an example of the disclosure is used to provide a user with information relating to the availability of parking spaces. The example may be implemented using methods and apparatus as described above. The example electronic device 21 in FIGS. 7A to 7D may comprise a touch sensitive display 23.

In FIGS. 7A to 7D the user of the electronic device 21 wishes to obtain information relating to the availability of parking spaces. The user wants to find a suitable time to visit the supermarket 73 when there will be plenty of parking spaces available.

Figure 7A:
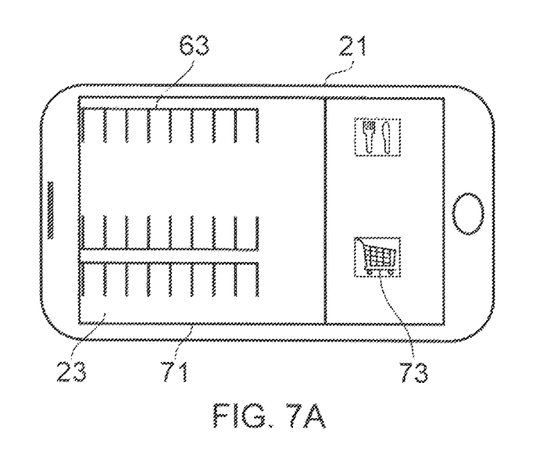
FIGS. 7A to 7D illustrates an example of the disclosure.

In FIG. 7A the user uses his electronic device 21 to view an image 63 representing the car park 71 of the supermarket 73. The image may comprise a schematic illustration of the car park 71. For example the image 63 may comprise a map. The map of the car park 71 may be obtained from a map application. The map of the car park 71 may be obtained from a remote server 35. The user need not be in the same location as the car park 71 in order to view the image of the car park 71 on the display. This may enable the user to obtain the information they need before they go to the supermarket 73.

Figure 7B:
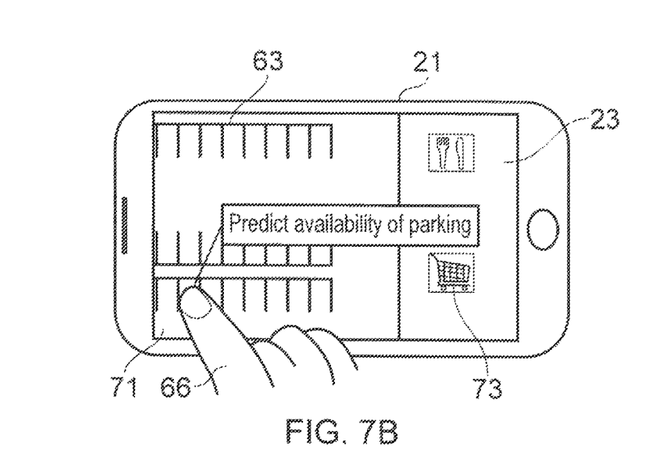

In FIG. 7B the user begins to make a user input. The user selects the car park 71 by holding his finger 66 on the area of the display 23 in which the car park 71 is displayed.

The electronic device 21 recognizes the selected item as the car park 71. The electronic device 21 may identify the item from additional information associated with the image 63 or by any other suitable technique. For instance the map may comprise tags or other additional information which may identify items and locations within the map.

The electronic device 21 may determine information 17 that the user may wish to obtain. The information 17 may be determined from the item which has been selected, context information which may have been obtained and the user input which has been made. In this example the context information may comprise the availability of parking spaces.

Figure 7C:
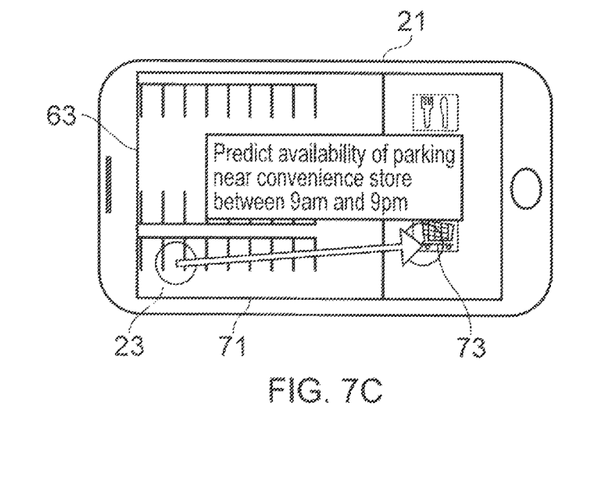

In FIG. 7C the user selects a second item in the image 63. In particular the user selects the supermarket 73 by dragging their finger 66 to the area of the display 23 in which the supermarket 73 is displayed. In response to this user input it may be determined that the information that the user wants is a prediction relating to both the car park 71 and the supermarket 73. This may be identified as the availability of car parking spaces during the opening hours of the supermarket 73. The opening hours of the supermarket 73 may be provided as additional information in a tag associated with the supermarket 73.

Figure 7D:
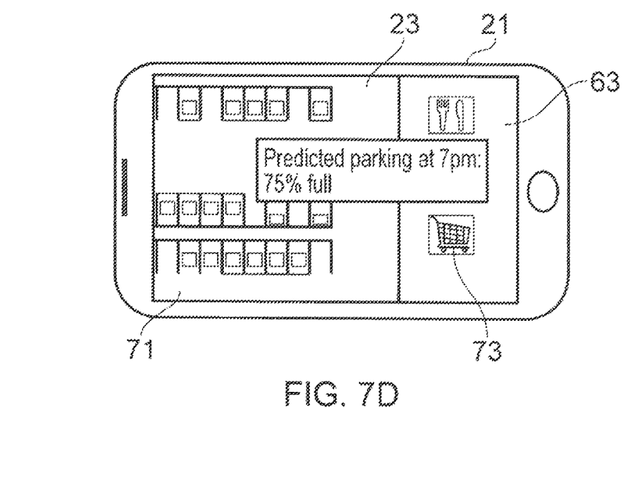

In FIG. 7D the information relating to the availability of car parking spaces during the opening hours of the supermarket 73 may be displayed on the display 23. The information displayed on the display 23 may correspond to the availability of car parking spaces at a particular time. The time could be the time the user could arrive at the supermarket 73. This time might be determined based on the current position of the user.

In the example of FIG. 7D the information relating to the availability of car parking spaces may also be displayed as a dynamic image on the display 23. The dynamic image may comprise representations of the capacity of the car park 71 at different times during the opening hours of the supermarket.

The availability of car parking spaces during the opening hours of the supermarket 73 may be represented on the display 23 by displaying cars in the car parking spaces to show how full the car park 71 is expected to be.

Once the user has this information they can decide which time will be most convenient for them to visit the supermarket 73.

In the example of FIG. 7A to 7D the time period is determined based on the additional information associated with the item which the user has selected. The time period may be detected automatically once the user has selected the supermarket 73. Other time ranges which may be selected automatically in various examples of the disclosure could include, tide cycle, sunrise and sunset, office/opening hours, and event starting and ending times or any other suitable time ranges.

Figure 8A:
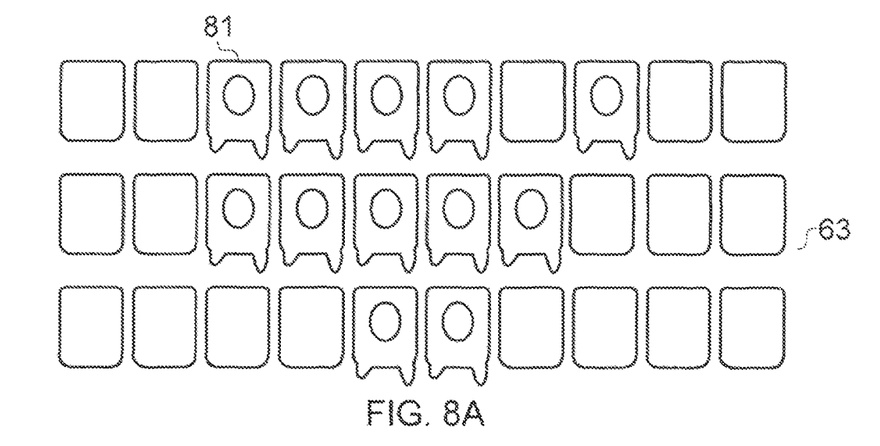
FIGS. 8A to 8C illustrates an example of the disclosure.
Figure 8B:
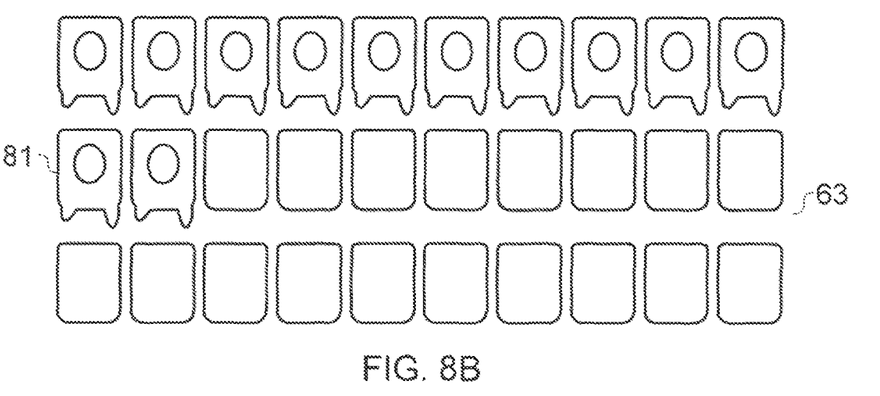
Figure 8C:
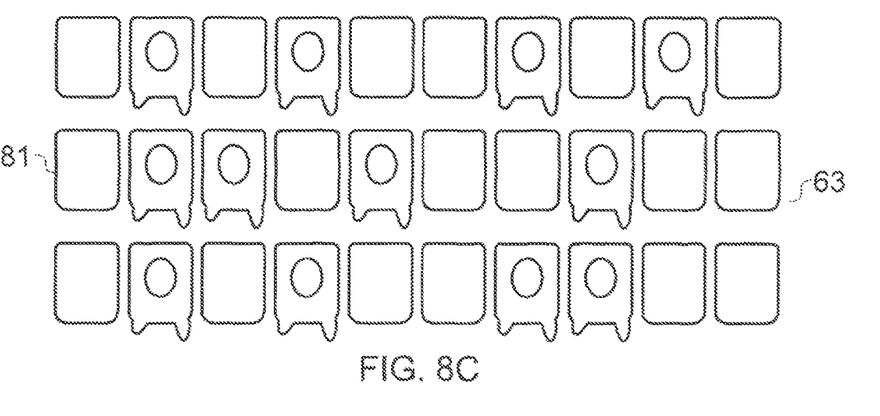

FIGS. 8A to 8C illustrate another example of the disclosure. FIGS. 8A to 8C show examples of how the information may be provided to the user once it has been obtained. In the examples of FIGS. 8A to 8C the information is provided as a visual representation which augments an image 63 on the display.

In the examples of FIGS. 8A to 8C the information may relate to the number of people in an event such as a sports event or theatre or any other suitable venue. The image 63 which is displayed on the display 23 comprises a schematic representation of the venue 81. In some examples the image 63 may comprise a segment of the venue or in other example the whole of the venue may be displayed.

In a first example FIG. 8A shows crowd distribution according to tickets sold. The tickets which have been sold may have a specific seat associated with them so the image 63 which is displayed to the user may show which seats are available.

FIG. 8B shows crowd distribution according to a "percentage view" which may be based on number of tickets sold. This may enable a user to see how busy the event is and how many tickets are remaining.

FIG. 8C shows crowd distribution with a randomization of the seats available based on number of tickets sold. This may enable a user to see how busy the event is and how many tickets are remaining.

It is to be appreciated that in other examples the information 17 may be provided to the user using other methods. For example the information may be provided as a text or audio output or in any other suitable manner.

Examples of the disclosure provide for methods and apparatus 1 which enable a user to easily access information 17 such as future predictions. The examples of the disclosure enable a user to easily select the items and/or parameters about which they want to obtain further information. The user can select such items simply by touch the area of the display 23 in which they are displayed. This provides for intuitive and simple user inputs.

The information 17 which is obtained may be displayed overlaying the images already on the display 23. This may make it easier for the user to interpret and use the information 17. This may make it easier for user to plan schedules and make decisions.

The information which is provided may be specific to the context of the user. For example the information which is provided may be specific to the current situation or location of the user or the image which is displayed on the display 23. This may enable the user to easily access appropriate information.

According to various but not necessarily all examples of the disclosure there may be provided an apparatus 1 comprising: means for detecting user selection of a part of an image wherein the image is displayed on a display 23; means for obtaining context information; and means for determining information to be provided to the user based on the user selection, the displayed image and obtained context information.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one." or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed. For example other parameters may be determined in other examples of the disclosure. Other parameters which may be determined in other examples comprises tidal and moon phase, sunrise and sunset times and sun position, weather forecasts, predicted parking usage levels/number of free places, predicted traffic levels, and crowd levels/number of free seats and crowd movement (e.g., entering and leaving) or any other suitable parameter.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus comprising:
   processing circuitry; and
   memory circuitry including computer program code, the memory circuitry and the computer program code configured to, with the processing circuitry, cause the apparatus to at least:
   detect a user selection of one or more portions of an image displayed on a display, the image comprising a parking lot;
   determine that the detected user selection is a selection of the parking lot;
   determine, based on a current position of the apparatus, an estimated time of arrival at the selected parking lot;
   obtain, based on the detected user selection, context information comprising a predicted availability of parking spaces for the parking lot at the estimated time of arrival, the predicted availability based on the context information including information from other devices including tracked and predicted movements of the other devices expected to be at the selected parking lot at the estimated time;
   generate, based on the obtained context information, a graphical representation of the predicted availability of parking spaces for the parking lot at the estimated time of arrival, the graphical representation providing a dynamic image indicative of how one or more parameters may change over time, the one or more parameters including the predicted availability; and
   display the generated graphical representation by at least augmenting the image, wherein augmenting the image comprises representing parking spaces of the parking lot as available or unavailable, based on the predicted availability of parking spaces for the parking lot at the estimated time of arrival.

2. The apparatus as claimed in claim 1, wherein the context information further comprises at least one of:
   information relating to the user;
   positioning information;
   direction information; and
   time of day.

3. The apparatus as claimed in claim 1, wherein representing parking spaces as available or unavailable comprises representing a percentage of available parking spaces as available and representing all remaining parking spaces as unavailable.

4. The apparatus as claimed in claim 1, wherein the image comprises at least one establishment, wherein the detected user selection comprises a selected establishment from the at least one establishment, wherein context information comprises hours of operation for the selected establishment, wherein the estimated time of arrival is during the hours of operation for the selected establishment, and wherein determination that the detected user selection is the selection of the parking lot and the selected establishment is based on a detection of a selection of the parking lot and a dragging motion from the parking lot to the selected establishment.

5. The apparatus as claimed in claim 1, wherein a plurality of information items related to the selected parking lot are determined, and wherein a user selectable list is provided to the user to enable the user to select one or more of the plurality of information items from the user selectable list.

6. The apparatus as claimed in claim 1, wherein the image comprises at least one of:
   an augmented reality image;
   a map;
   photographs; and
   video images.

7. The apparatus as claimed in claim 1, further comprising a sensor configured to obtain the current position.

8. The apparatus as claimed in claim 1, wherein the graphical representation is obtained, in response to detecting the user selection, from local storage or over a network.

9. The apparatus as claimed in claim 1, wherein representing parking spaces as available or unavailable comprises representing a randomized number of available parking spaces as available and representing all remaining parking spaces as unavailable.

10. The apparatus as claimed in claim 1, wherein representing parking spaces as available or unavailable comprises representing a randomized number of unavailable parking spaces as unavailable and representing all remaining parking spaces as available.

11. A method comprising:
    detecting, by a mobile device, a user selection of one or more portions of an image displayed on a display, the image comprising a parking lot;
    determining that the detected user selection is a selection of the parking lot;
    determining, based on a current position of the mobile device, an estimated time of arrival at the selected parking lot;
    obtaining, based on the detected user selection, context information comprising a predicted availability of parking spaces for the parking lot at the estimated time of arrival, the predicted availability based on the context information including information from other devices including tracked and predicted movements of the other devices expected to be at the selected parking lot at the estimated time;
    generating, based on the obtained context information, a graphical representation of the predicted availability of parking spaces for the parking lot at the estimated time of arrival, the graphical representation providing a dynamic image indicative of how one or more parameters may change over time, the one or more parameters including the predicted availability; and
    displaying the generated graphical representation by at least augmenting the image, wherein augmenting the image comprises representing parking spaces of the parking lot as available or unavailable, based on the predicted availability of parking spaces for the parking lot at the estimated time of arrival.

12. The method as claimed in claim 11, wherein the context information further comprises at least one of:
    information relating to the user;
    positioning information;
    direction information; and
    time of day.

13. The method as claimed in claim 11, wherein representing parking spaces as available or unavailable comprises representing a percentage of available parking spaces as available and representing all remaining parking spaces as unavailable.

14. The method as claimed in claim 11, wherein the image comprises at least one establishment, wherein the detected user selection comprises a selected establishment from the at least one establishment, wherein context information comprises hours of operation for the selected establishment, wherein the estimated time of arrival is during the hours of operation for the selected establishment, and wherein determining that the detected user selection is the selection of the parking lot and the selected establishment is based on a detection of a selection of the parking lot and a dragging motion from the parking lot to the selected establishment.

15. The method as claimed in claim 11, wherein a plurality of information items related to the selected one or more portions are determined, and wherein a user selectable list is provided to the user to enable the user to select one or more of the plurality of information items from the user selectable list.

16. The method as claimed in claim 11, wherein the image comprises at least one of:
an augmented reality image;
a map;
photographs; and
video images.

17. The method as claimed in claim 11, further comprising obtaining, from a sensor, the current position.

18. A computer program embodied on a non-transitory computer readable medium, the computer program comprising instructions causing, when executed on at least one processor, at least one apparatus to:
detect a user selection of one or more portions of an image displayed on a display, the image comprising a parking lot;
determine that the detected user selection is a selection of the parking lot;
determine, based on a current position of the apparatus, an estimated time of arrival at the selected parking lot;
obtain, based on the detected user selection, context information comprising a predicted availability of parking spaces for the parking lot at the estimated time of arrival, the predicted availability based on the context information including information from other devices including tracked and predicted movements of the other devices expected to be at the selected parking lot at the estimated time;
generate, based on the obtained context information, a graphical representation of the predicted availability of parking spaces for the parking lot at the estimated time of arrival, the graphical representation providing a dynamic image indicative of how one or more parameters may change over time, the one or more parameters including the predicted availability; and
display the generated graphical representation by at least augmenting the image, wherein augmenting the image comprises representing parking spaces of the parking lot as available or unavailable, based on the predicted availability of parking spaces for the parking lot at the estimated time of arrival.

19. The computer program as claimed in claim 18, wherein representing parking spaces as available or unavailable comprises representing a percentage of available parking spaces as available and representing all remaining parking spaces as unavailable.

20. The computer program as claimed in claim 18, wherein the image comprises at least one establishment, wherein the detected user selection comprises a selected establishment from the at least one establishment, wherein context information comprises hours of operation for the selected establishment, wherein the estimated time of arrival is during the hours of operation for the selected establishment, and wherein determining that the detected user selection is the selection of the parking lot and the selected establishment is based on detecting a selection of the parking lot and a dragging motion from the parking lot to the selected establishment.

* * * * *